Feb. 13, 1968   J. FRASER   3,368,758
FLUID CONTROL APPARATUS
Filed June 28, 1965   3 Sheets-Sheet 1
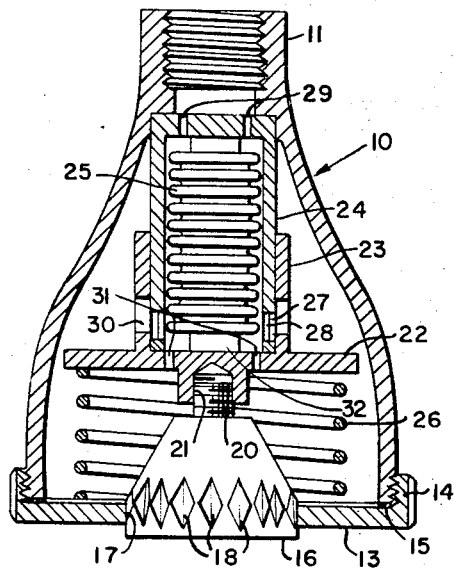
FIG.1.
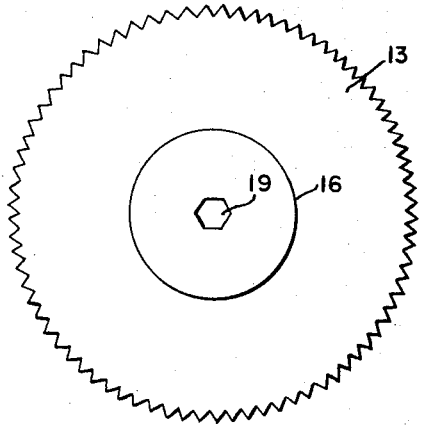
FIG.2.
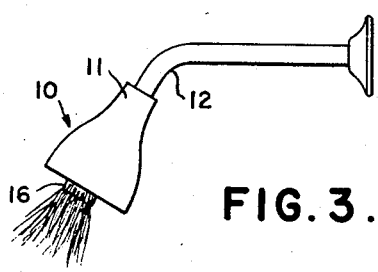
FIG.3.
FIG.4.
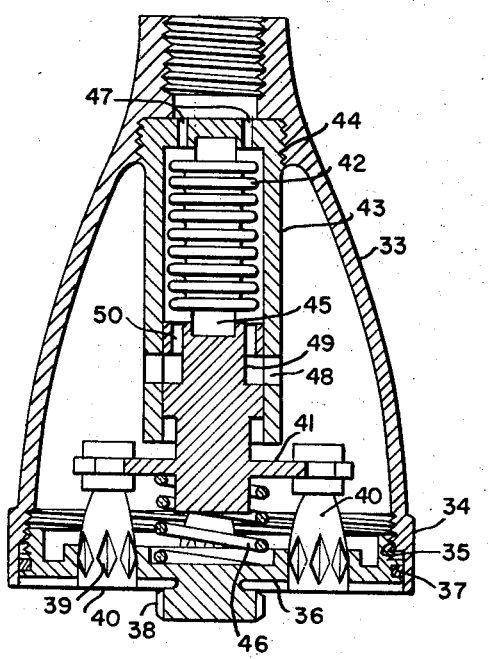
FIG.5.
INVENTOR
James Fraser
BY *A. M. Holcombe*
ATTORNEY Feb. 13, 1968   J. FRASER   3,368,758
FLUID CONTROL APPARATUS
Filed June 28, 1965   3 Sheets-Sheet 2

INVENTOR
James Fraser

BY *A. M. Holcombe*

ATTORNEY

Feb. 13, 1968  J. FRASER  3,368,758
FLUID CONTROL APPARATUS
Filed June 28, 1965  3 Sheets-Sheet 3

INVENTOR
James Fraser
BY *A. M. Holcombe*
ATTORNEY

United States Patent Office 3,368,758
Patented Feb. 13, 1968

3,368,758
FLUID CONTROL APPARATUS
James Fraser, 2326 Grubb Road,
Wilmington, Del. 19803
Filed June 28, 1965, Ser. No. 467,265
5 Claims. (Cl. 236—93)

ABSTRACT OF THE DISCLOSURE

Apparatus for controlling the flow of water in shower heads wherein the flow of hot water is subject to sudden fluctuation. The apparatus is designed to automatically close the valve controlling the hot water in order to prevent injury to persons using the system from scalding. The thermostat actuating the valve is so designed as to be readily removable and replaceable by the user. Adjustment of the temperature at which the thermostat will function is disclosed.

---

This invention relates to temperature responsive fluid control apparatus typified by so-called safety thermostat shower heads, wherein a quick response to sudden increases in temperature is desired without undue choking of the normal flow. Heretofore such devices have been subject to corrosion and accumulation of dirt and deposits of foreign matter in the water.

Objects of the invention are to enable the thermostat to be readily removed and replaced, to improve the self-cleaning character and the certainty and rapidity of action of the apparatus under normal operating conditions, to enable the working parts to be readily removed for examination and repair or replacement, and to extend the useful life of the apparatus.

Further objects are to provide means for adjusting the setting of the apparatus to operate automatically at a desired temperature, and to simplify the mechanical design of the operating means and control mechanism.

The invention as illustrated herein aims to protect users of shower apparatus from scalding due to sudden changes in the pressure and temperature of the hot and cold water mixture at the shower head, by means operating automatically and instantaneously at all times thereby enabling the bather to adjust the manual controls to suit the altered flow conditions; but the invention is not restricted to such employment nor to the illustrative embodiments of the invention hereinafter described. What the invention comprises is more fully set forth in the appended claims.

In the accompanying drawings illustrating various embodiments of the invention, FIG. 1 is a vertical cross-sectional view of a shower head on its principal axis, showing the spray controlling plunger in side elevation;

FIG. 2 is a bottom view of the same;

FIGS. 3 and 4 are side views of the shower head illustrated in FIGS. 1 and 2 assembled on a shower stall outlet pipe in fine spray and full open positions, respectively, of the plunger;

Figure 6:
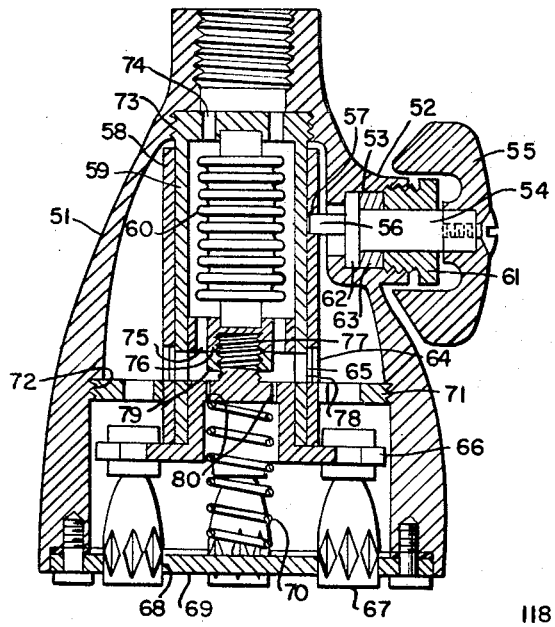
Figure 8:
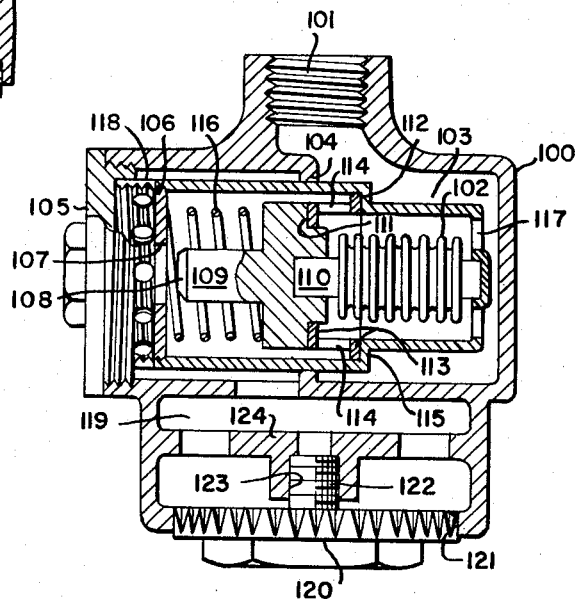
Figure 7:
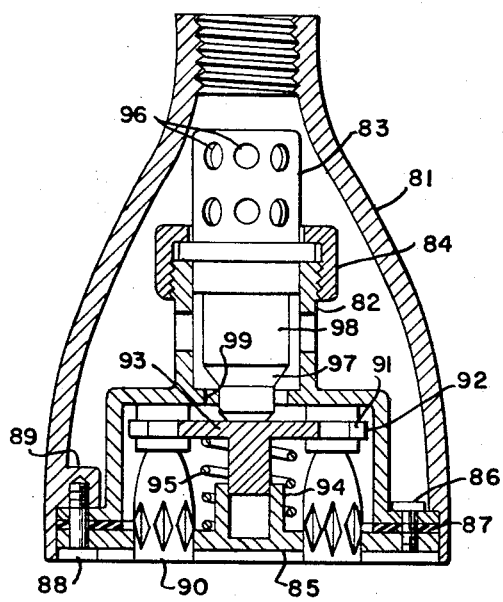

FIG. 5 is a view similar to FIG. 1, showing a modification of the device illustrated in FIGS. 1 and 2 with the spray openings disposed around a plurality of circularly spaced cylindrical plungers in a plunger carrier mounted on an automatically actuated thermostat, and cooperating with circular openings in the plunger face plate, which is provided with means for vertical adjustment to control the character of the spray in normal operation;

FIG. 6 is a view similar to FIG. 5 showing a modification wherein the thermostat and plunger carrier are manually adjustable for controlling the spray openings and the plunger face plate is fixed in the shower head;

FIG. 7 is a view similar to FIG. 5, showing a modified form of the invention wherein the thermostat and valve assembly is removable from the body as a unit together with the nozzle and orifice assembly;

FIG. 8 is a cross-sectional view similar to FIG. 1 showing a modified arrangement of the thermostat and flow-controlling valve to enable ready removal and replacement thereof without dis-assembling the shower head.

Figure 9:
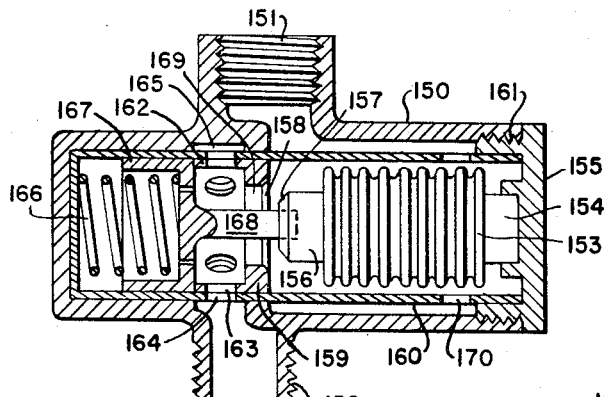
Figure 10:
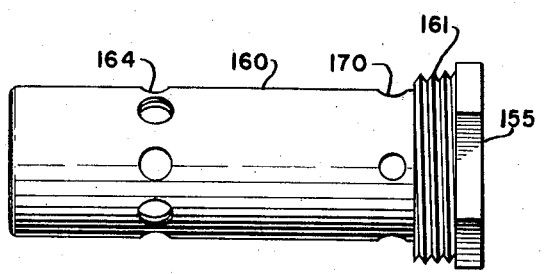
Figure 11:
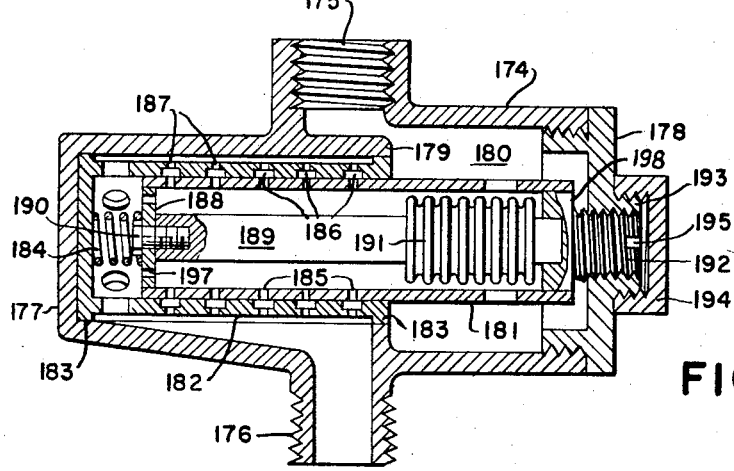
Figure 12:
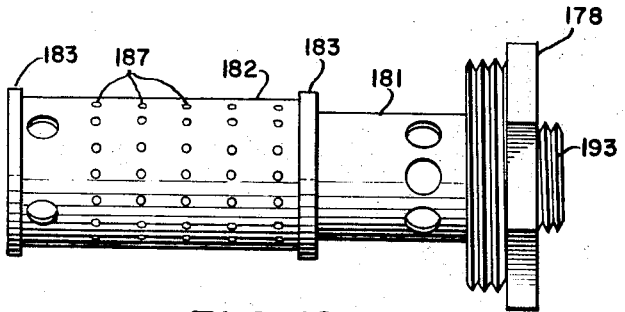
Figure 13:
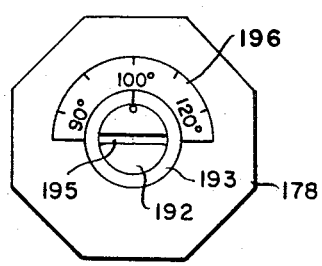

FIG. 9 is a view in cross-section on the principal axis of another form of the invention wherein the thermostat and cut-off valve are disposed at right angles to the direction of flow of water from the supply to the shower head;

FIG. 10 is a side elevation of the removable cartridge type thermostat and cut-off valve unit of the form of my invention shown in FIG. 9;

FIG. 11 is a view similar to FIG. 9 showing a modified form of cut-off valve and thermostat control device which is quick acting and of superior capacity;

FIG. 12 is a side elevation of the unitary removable thermostat and valve element as shown in FIG. 11; and FIG. 13 is an end view of the unit shown in FIG. 12.

I am aware that devices for preventing overheated water from scalding shower-bath users have been patented in the past, but all such devices heretofore used so far as I know have had practical disadvantages that have prevented their widespread adoption. See the following patents which are examples of such drawbacks and shortcomings: Geisler, No. 1,791,811; Hetherington, No. 1,814,512, and No. 2,284,736; Herzbrun et al., No. 2,010,455; and Schlaich, No. 2,534,378.

In the form of the invention shown in FIGS. 1 and 2, the shower head body 10 is internally threaded at its upper end 11 to receive the threaded end of the usual water supply riser pipe arm 12 (see FIGS. 3 and 4) which is bent to support the shower head at a forwardly depending angle and at a convenient height in a shower stall or over the bath tub or other place of use provided with manual control valves or other means for regulating the fluid supply mixture.

The outlet end of the body 10 is closed by a manually removable cap or orifice member 13 which has an outer rim 14, threaded internally and knurled or roughened on its outer edge, and which screws on to the threaded exterior of the lower edge of the body as is shown in FIG. 1, or is removably secured thereto, as is hereinafter described. In the form of the invention illustrated, a ring shape gasket 15 is interposed between the inner side of the orifice member 13 and the end of the body 10; but shims or other suitable packing material may be used to prevent leakage at this joint and to locate the orifice member at the desired height for proper cooperation with the orifice plug 16 which is cylindrical at its lower end and projects through a cylindrical opening 17 at the center of the orifice member. The outer edge of the plug above its lower end is provided with inwardly tapering notches 18 which cooperate with the inner face of the orifice opening 17 to form spray nozzles which permit a graduated flow of water to pass through them, the lower the position of the plug 16 the greater the flow opening. A socket nut 19 or other convenient means for manually rotating the plug 16 is provided on its lower end, and the upper end 20 of the plug 16 is screw threaded to engage in a threaded opening 21 axially disposed in a cut-off valve 22 movably mounted above it in the valve body.

A sleeve portion 23 projects upwards from the valve body 22 and slidably encompasses the case 24 of the bellows-type thermostat element 25 contained therein, all of which components are concentrically arranged in the upper part of the body 10 and removable therefrom through its lower open end upon removal of the cap member 13. A coil spring 26 supported by the orifice cap normally retains the valve 22, case 24 and thermostat 25 in their operating positions.

A shallow groove 27 is cut around the lower end of the case 24, and passages 28 at spaced positions around the case connect this groove with the interior of the case. Passages 29 in the inner end wall of the case 24 connect it with the supply available through the pipe 12. Ports 30 in the sleeve portion 23 of the valve 22 are adapted to register with the groove 27 in normal position of the valve, permitting free flow of water from the supply pipe 12 to the nozzle openings 18.

One or more small bleed openings 31 in the valve 22 permit a limited flow of water past the thermostat 25 to avoid pocketing, thus hastening its response to ensuing changes in the temperature of the water supply.

As the temperature of the water entering the case 24 from the supply increases, the flow around the thermostat element heats the expansible material therein and causes it to lengthen axially thereby causing its lower end 32 to engage the center of the valve 22 and depress it, whereby the ports 30 are caused to move downwards with respect to the groove 27 to the point that flow from said groove through said ports is diminished and ultimately cut off should the temperature rise to an unsafe degree for bathing purposes. This can be determined in advance and set at the factory.

The danger point can be adjusted as desired at the place of use by suitably adjusting the vertical position of the plug 16 with respect to the valve 22 by rotation of the former to cause its threaded end 20 to engage more or less in the threaded opening 21 of the latter, lowering the plug resulting in lowering the pressure of the spray and causing the direction of flow to drop and avoid impinging upon the body of the bather as illustrated in FIGS. 3 and 4.

The thermostat element 25 can readily be removed from the shower head without removing the latter from the supporting fixture by removing the cap 13, whereupon the spring 26 will fall out and the plug 16 and valve 22 can be withdrawn as a unit, exposing the thermostat 25 and its case 24 which can be removed together; and the various parts can be replaced as readily by reversing the operation. The fit of the sliding parts is snug enough to prevent water from passing between them in substantial amounts but is free enough to permit manual removal and replacement. The pressure of the spring 26, which is compressed between the cap 13 and valve 22, is adequate to prevent rotation of the latter in the valve body 10 during normal operation of the appartus, whereby the plug 16 may be turned manually to adjust its position vertically while the parts are assembled in their operating positions as shown in the drawings.

In the modified form of the invention shown in FIG. 5 the shower head body 33 is threaded internally at its lower end and provided with a depending flange 34 within which the externally threaded rim 35 of the orifice cap member 36 is screwed. Packing means 37 is arranged in an external groove in the rim 35 wherein it is held by its resiliency. A knurled knob 38 or other manually operable device is provided on the lower face of the orifice cap for adjusting it in place at a suitable height to cooperate with the notches 39 in the lower edges of the orifice plugs 40, of which there may be two or more uniformly spaced around the central axis of the shower head on a vertically movable carrier 41 as is well known in shower heads now in use.

My improvement comprises a thermostat element 42 supported in a generally cylindrical case 43 externally threaded at its upper end and removably screwed into an internally threaded seat 44 axially disposed in the upper end of the body 33 of the shower head. The upper end of the plug carrier 41 projects into and fits slidably within the case 43 to engage the lower end 45 of the thermostat in normal operating position of the apparatus, all of the three components normally being held in place in axial alignment by interengagement at their ends under the pressure of a coil spring 46 retained by the cap 36 between it and the plug carrier.

The case 43 is provided with passages 47 at its upper end connecting with the water supply, and ports 48 spaced around its side wall near the lower edge adapted to register with an encircling groove 49 near the upper end of the plug carrier 41 in normal operation of the apparatus, the groove or port 49 being connected by flow passages 50 in the upper end of the plug carrier 41 with the space within the case 43 surrounding the thermostat.

The operation of the form of the invention shown in FIG. 5 is much the same as that shown in FIGS. 1 and 2, so far as ease of assembly and removal of the thermostat and valve operating parts is concerned, removal of the cap 36 and spring 46 resulting in freeing the carrier 41 and thermostat 42 from the shower head. The case 43 may readily be unscrewed and removed also if desired.

In FIG. 6 a form of the invention is shown as applied to a common type of shower head having means for adjusting the character of the spray by the bather while bathing. The shower head body 51 has a boss 52 on one side surrounding a bearing aperture 53, wherein a shaft 54 provided with a knob or handle 55 on its outer end is rotatably mounted to turn on a horizontal axis, the inner end of the shaft carrying an eccentric pin 56 which engages in a slot 57 in the upper end of a sleeve 58 which surrounds the case 59 of the thermostat elements 60. A bushing 61 screwed into or otherwise secured in the boss 53 holds the shaft 54 in place.

Preferably the shaft 54 is provided with a flange 62 near its inner end which seats against the side wall of the body at the inner end of the aperture 53, and suitable packing material 63 between this flange and the bushing 61 retains the shaft 54 and packing material in place and prevents leakage of water through the bushing. To avoid interference with the operation of the cut-off valve, the sleeve 58 has openings 64 in its lower edge which register with the groove 65 in the outer face of the thermostat case 59 near its lower edge in all adjusted positions of the sleeve, which is entirely independent of the cut-off valve, as hereinafter described.

At its lower edge the spray control sleeve 58 bears against the carrier member 66 for the grooved orifice plugs 67 so as to depress the latter with reference to the apertures 68 in the orifice cap 69 when the knob 55 is turned from its position as shown in FIG. 6, thereby increasing the spray openings as desired by the bather. Normally the spring 70 retains the orifice plug carrier 66 in contact with the spray control sleeve 58 except when the thermostat operates to regulate the flow of water through the apparatus.

The spray control sleeve 58 and carrier member 66 may be guided in their up and down movements by means of a guide ring 71 which may be screwed into an internally threaded recess 72 in the body of the shower head or otherwise removably secured in place without interfering with the normal operation of the device or with the removal and replacement of the thermostat. Preferably the thermostat case 59 is provided with screw threads 73 which engage in a corresponding threaded recess in the body to retain the removable operating parts in alignment.

In the normal functioning of the apparatus, the water from the supply at the desired temperature for bathing flows through passages 74 into the thermostat case, around the thermostat element, and through passages 75 in the cut-off valve member 76 (in which the lower end of the thermostat element is seated) into the space surrounding the threaded upper end 77 of the carrier 66 on which the valve member is mounted, from which space the water can pass through the open ports 78 into the groove 65 surrounding the lower end of the thermostat case and out into the space in the lower part of the valve body and thence to the spray nozzle orifices.

As the thermostat 60 heats up it lengthens and depresses the cut-off valve 76 to close the ports 78 and reduce the flow of heated water to the nozzles, and at the same time the orifice plugs are lowered by the lowering of the carrier member 66 against the pressure of the spring 70 to diminish the velocity of flow. The height of the cut-off valve 76 with respect to the carrier 66 can be adjusted by rotating it on the threaded stem 77 and locking it in position by means of the nut 79, thereby fixing the temperature at which the thermostat will start to operate to cut off the flow of water. Bleed openings 80 are provided in the top wall of the carrier member 66 to permit a small flow of water from the space below the cut-off valve at all times to prevent pocketing of the water in the space surrounding the thermostat and thereby delaying the response of the thermostat, following a reduction of the temperature of the water, to return the cut-off valve to normal operating position.

The shower head shown in FIG. 7 is like that shown in FIG. 5, but is simpler to make and assemble, all of the working parts being mounted for removal from the shower head body 81 as a self-contained unit comprising a frame 82, to the screw threaded upper end of which the thermostat element 83 is secured by an internally threaded ring 84, and to the flanged lower edge of which the orifice cap or plate 85 is secured by screws 86, a packing ring 87 being clamped between the meeting edges to prevent leakage of water. Preferably, additional screws 88 are provided for securing the frame 82 and the orifice plate 85 to the body at circularly spaced intervals around their meeting edges, at which points bosses 89 are formed in the body into which the screws 88 engage.

The plug members 90 which carry the tapered orifices are loosely mounted at their grooved upper ends in slots 91 at the outer ends of arms 92 which project radially from the carrier 93. The lower end of the carrier is cylindrical and slides on a vertical axis in a hollow cylindrical guide post 94 which is formed on the orifice cap 85 at its center and serves to maintain the carrier and orifice plugs in central alignment. A spring 95 surrounding the post 94 normally supports the carrier 93 and orifice plugs 90 in fine spray position as shown in FIG. 7.

By substituting packing rings of different thicknesses from the ring 87 shown in the drawings, the relative position of the orifice plugs 90 with respect to the lower face of the orifice plate 85 can be adjusted to produce the character of spray desired. This is readily done by removing the screws 88 and withdrawing the entire control mechanism intact from the body 81, whereupon the screws 86 can be removed to change the packing. In much the same way the spring 95 can be changed to suit the temperature at which the thermostat unit will function to shut off the flow of hot water should it become excessive.

The details of the thermostat unit 83 are not shown as such components are well known in the art and can be secured from many commercial sources. Advantageously the case of the thermostat element will be provided with apertures 96 at or near each end to permit circulation of water around the temperature responsive element when the shower is in use. The cut off valve 97 is of tapering form and is carried by a plunger 98 housed in the thermostat case and responsive to movements of the temperature responsive element thereof to cause the valve face to approach the valve seat 99 as the temperature of the incoming water rises towards the danger point. The valve seat 99 is formed in the frame 82 in axial alignment with the axis of the valve plunger 98 and is tapered to conform to the tapered face 97 of the cut-off valve. It normally presses against the top face of the plunger carrier 93, which is held up by the spring 95 with sufficient pressure to resist movement of the thermostat below the temperature for which it is set to operate the cut-off valve. As heretofore described, different operating pressures can be secured by substituting other springs as may be required to produce closure of the valve between the temperature ranges desired.

In the modified form of the invention shown in FIG. 8, wherein the shower head body 100 is provided with an internally threaded pipe connection 101 for attachment to the water supply bracket arm, as herein described in connection with the form shown in FIG. 1, the thermostat element 102 is arranged at right angles to the vertical axis of the shower head and is supported in a generally cylindrical cartridge-like case 103, removably mounted in a transverse chamber in the shower head body and supported by a partition flange 104 at its middle and a closure or screw cap 105 at its outer end which is provided with a flanged rim 105' into which the outlet end of the thermostat case fits snugly and is secured by means of friction. The inner end of the thermostat element is supported by a central socket 103' formed in the closed end wall of the case 103.

The outer end of the thermostat element case 103 is internally screw threaded to receive the externally screw threaded valve seat member 106 which is normally secured by any suitable means and has a circular seat 107 at its center shaped to receive the tapered outer end 108 of the movable cut-off valve member 109 which at its inner end engages the adjacent end 110 of the bellows-type thermostat element 102. The cut-off valve member has a circular flange 111 at its inner end upon which is mounted a ring spider 112 having oppositely disposed inner and outer flanges 113 around its edges and a series of open passages 114 spaced apart in its circumference. This spider is mounted in the case 103 with the outer flange 113 abutting against a shoulder 115 formed in the side wall of the case 103 surrounding the thermostat bellows and facing toward the outer end thereof to provide a stop against which the spider is pressed by the valve plunger 119 under the influence of a spring 116 which surrounds the valve plunger 109 and abuts against the adjustable valve seat member 106 in the open end of the thermostat case.

Open passages 117 and 118 are provided in the inner or closed end wall of the thermostat case adjacent the thermostat element 102 and in the side wall of the thermostat case adjacent its outer end respectively, the latter discharging into the body 100 at its end near the cap 105, and these passages permit free flow of water through the thermostat unit and into the shower head spray chamber 119 at all times when the cut-off valve is open.

The shower head in FIG. 8 for purposes of illustration embodies a notched plunger or circular plate 120 which is adjustable with respect to the circular spray orifice 121 in the body 100 by means of a screw threaded stem 122 at the center of the plate in engagement with an internally threaded socket 123 on an inner wall 124 of the body.

The operation of the apparatus as shown in FIG. 8 is similar to that shown in FIG. 1 excepting that there is no mechanical connection between the cut-off valve and the shower head such as to move the latter when the former is actuated by an increase in the temperature of the water to cut down the flow. The principal advantage of the invention shown in FIG. 8 is that the thermostat element and cut-off valve assembly is removable from the valve body 100 intact with the case 103 by merely unscrewing the cap 105, which cap may then be removed from the case 103 and enclosed valve assembly and replaced on the shower head body, permitting use of the shower as usual under the manual control of the bather.

The form of the invention shown in FIGS. 9 and 10 similar to that shown in FIG. 8, but is intended for installation at the end of the supply pipe or bracket arm which supports the shower head closely adjacent thereto, the body 150 of the device being provided on one side with a threaded socket 151 to receive the threaded end of the pipe bracket. A water passage leads to the shower head through the externally threaded outlet pipe 152 on the opposite side of the body. The thermostat element 153 is arranged with its axis at right angles to that of the inlet and outlet pipe connections, one end 154 being retained in a recess in the end cap 155 and the opposite end 156 being formed to present a tapered valve face 157 for cooperating with a valve seat 158 formed on the cut-off valve ring member 159 which is slidable in the cartridge type thermostat case 160. The thermostat case is removably held in the valve body at its outer end within the externally threaded flange 161 of the end cap 155 which closes it and holds it and the valve actuating parts in place in the body 150 in the normal use of the apparatus.

The cut-off valve ring member 159 has a flange 162 on its edge away from the seat 158 which is provided with passages 163 normally in register with passages 164 in the side wall of the thermostat case which lead into a groove 165 in the inner wall of the body 150 leading to the outlet 152, as shown in FIG. 9. A coil spring 166 in the closed end of the thermostat case presses against the adjacent face of the valve returning slide 167, which has a stem 168 on its face remote from the spring and which engages at all times against the end face of the thermostat element 153, which is recessed to received it as shown in dotted lines in FIG. 9, and thus functions to hold the latter in axial alignment with the operating parts of the cut-off valve.

The center aperture 169 through the cut-off valve ring member is slightly larger in diameter than the adjacent end 156 of the thermostat element so that when the thermostat expands sufficiently to cause the seats 157 and 158 to approach each other, thereby diminishing the flow through the apparatus, there will be a narrow passage left between them for leakage, constituting a bleed from the space surrounding the thermostat to prevent water from pocketing there and thereby delaying the response of the thermostat.

In the normal operation of the apparatus, water flows from the supply through the passages 170 in the end of the thermostat case 160 near the cap 155 and into the space within the case surrounding the thermostat, from which it flows around the length of the thermostat and out to the shower head through the center of the cut-off valve and its open passages 163 and the open passages 164 in the thermostat case leading to the groove 165 in the body which is in communication with the outlet 152. Upon an increase in the temperature of the water reaching the apparatus, the thermostat element will expand, increasing its length and forcing the cut-off valve returning member 167 to compress its spring 166 and bring the valve seats 157 and 158 nearer together, cutting down the flow to some extent. This action will continue with the passage of more highly heated water until the pressure of the expanding thermostat almost completely stops the flow, at which point the cut-off valve flange 162 will have completely closed the openings through the apertures or ports 163 and 164, thus shutting off the flow almost entirely, although the loose fit of the cut-off valve 159 and flange 162 in the case 160 permits some leakage from the space within the case to the shower head so as to avoid pocketing the water around the thermostat.

So long as the temperature of the water from the supply remains at too high a degree for safe bathing the valve remains in the cut-off position, and the small amount of water passing through merely drips from the shower head. As the temperature of the incoming water lowers, however, it will flow around the thermostat and cool the latter, thus progressively shortening its length and increasing the flow through the passages 163 and 164, causing a rapid return of the movable parts of the valve to normal fully open position. The temperature at which movement of the cut-off ring member will occur may be controlled by changing the spring 160 to suit that desired, different strengths of spring being readily substituted by removing the end cap 155 and withdrawing the thermostat case 160 and its contents from the body 150 without disturbing the shower head or piping of the shower stall.

In the form of the invention shown in FIGS. 11, 12 and 13, the cut-off valve body 174 is provided with inlet and outlet pipe connections 175, 176 to the supply pipe and shower head respectively, to which it is connected as a permanent part of the shower bath installation. The valve operating parts are mounted in a crosswise chamber in the valve body with their principal axis transverse to the direction of flow between the inlet and outlet connections, this chamber being closed at one end by the side wall 177 of the body and at the other end by a suitable closure member such as the screw cap 178.

The cross wall 179 divides the chamber 180 into two parts having no communication with each other, other than through the cut-off valve 181, which is cylindrical in form and is slidably mounted in a cylindrical sleeve 182 frictionally held in a cylindrical bore in the body crosswise of the axis of flow to the side thereof away from the cap 178. The sleeve has small flanges 183 at each end which position it in the bore and form a narrow passage around its exterior within the body. This passage communicates at its inner lower side with the outlet connection 176 to the shower head. The inner end of the sleeve 182 is closed.

Within the sleeve 182 between its inner end and the adjacent end of the cut-off valve is mounted a spring 184, which operates to hold the cut-off valve in open position against the tendency of the thermostat to expand when exposed to warm water. The cylindrical wall of the cut-off valve 181 has several rings of circumferentially arranged ports 185 spaced axially around and along its exterior, and each such ring of circumferentially spaced ports registers with one of a series of circumferential grooves 186 in the interior of the cut-off valve sleeve 182 in the open position of the valve. Passages 187 connect these grooves with the surrounding space leading to the outlet pipe connection 176.

The end of the cut-off valve 181 remote from the inlet is substantially closed by a wall 188 which may be formed integral therewith and to which is secured an operating rod 189, as by means of the bolt 190. The other end of the rod 189 is secured to the adjacent end of the thermostat element 191 by any suitable means. The open end of the cut-off valve 181 encircles the thermostat element and is slidably supported by the cylindrical outer face of the screw plug 192, the inner end of which is provided with a flange 198 for this purpose. This screw plug also supports the adjacent end of the thermostat element 191 in axial alignment with the cut-off valve, being mounted in an internally threaded boss 193 formed on the end body closure member 178 concentric with its axis. A suitable cap member 194 may be supplied to cover the exposed end of the screw plug 192 which is formed with a slot 195 to receive a screw driver or other suitable turning means. This cap is not shown in FIGS. 12 and 13. A scale 196 is advantageously provided on the closure 178 for adjusting the screw plug to suit the temperature at which it is desired to have the thermostat operate to close the cut-off valve, as is known in the art.

The operation of the valve assembly shown in FIGS. 11, 12 and 13 is similar to that shown in FIGS. 9 and 10 except that one or more bleed openings 197 are provided in the end wall 188 of the cut-off valve 181 for allowing a small flow of water to pass through the valve at all times that the pressure is turned on by the bather in order to expedite the functioning of the thermostat to return the valve to normal open position after having closed in response to a flow of dangerously overheated water.

This arrangement provides a quick opening and closing multi-face valve having a much greater capacity than a single face valve as commonly used, and enables a thermostat with a very short throw movement to control the volume of water usually supplied to a shower head for bathing purposes.

What is claimed is:
1. A unitary safety control valve for a shower head comprising a bellows type thermostat element enclosed in a removable cartridge-like case having a closed end, a closable end and a cylindrical side wall portion provided with fluid inlet and outlet openings spaced longitudinally thereof, a circular valve seat mounted in and circumferentially fitting said side wall between said openings, a valve element carried by said thermostat element and movable thereby toward and from said seat with changes in the temperature of the fluid flowing through said case to control the flow thereof, and an axially disposed member aligned with said valve element and extending through said valve seat for engagement with spring means mounted within said case adjacent to its closed end, said axially disposed member comprising means for movably supporting it in said case.

2. A unitary safety control valve for a shower head comprising a bellows type thermostat element enclosed in a removable cartridge-like case having a closed end, a closable end and a cylindrical side wall portion provided with fluid inlet and outlet openings spaced longitudinally thereof, a valve seat circumferentially fitting said side wall, a valve element carried by said thermostat element and movable thereby toward and from said seat with changes in the temperature of the fluid flowing through said case to control the flow thereof, means for adjusting the relative position of said seat and thermostat element axially in said case, said adjusting means being carried by the closable end of said case and removable therewith, an axially disposed member aligned with said valve element and spring means cooperating therewith mounted within said case adjacent to its closed end, said axially disposed member comprising means for movably supporting and guiding said thermostat element in said case.

3. A replaceable automatic cut-off valve assembly for shower head control valves of the type having a body provided with inlet and discharge passages, said valve assembly having an inner valve part comprising an expansible type thermostat element mounted in an enclosing chamber member having a cylindrical side wall portion and an end wall, an axially removable end wall portion spaced from said closed end wall and in operative alignment with the adjacent end of said thermostat element, a plurality of fluid passage openings in said chamber side wall axially spaced lengthwise thereof forming valve means movable with said thermostat element; and said valve assembly having an outer valve part comprising a cylindrical casing portion fitting around said thermostat element enclosing member with fluid passage openings in its side wall axially spaced to register individually with the respective openings in said thermostat element enclosing member side wall in adjusted open position of said valve, a spring in said casing portion adjacent the closed end wall of said thermostat element enclosing member urging the latter axially toward its open valve position, and fluid passage openings in said thermostat element enclosing member side wall and casing side wall respectively at opposite ends thereof, said openings being adapted to communicate respectively with the inlet and discharge openings in the shower head control valve body when assembled therein.

4. A replaceable automatic cut-off valve assembly for shower head control valves as set forth in claim 3 in which the end wall of the thermostat element enclosing member is provided with a passage permitting reduced flow through the valve at all positions of the thermostat element.

5. A unitary automatic cut-off valve assembly for shower head control valves comprising a body provided with inlet and discharge fluid flow passages and a valve assembly chamber having its principal axis aligned transversely with respect to at least one of said passages; said valve assembly having a valve part comprising an expansible type thermostat element mounted for lengthwise expansion in an enclosing casing member, said valve part and casing member being axially disposable in said valve assembly chamber, said casing member having a cylindrical side wall portion spaced from said valve assembly chamber together with a thermostat element supporting end wall portion adjacent one end and an end wall portion spaced axially from said thermostat element supporting end wall portion adjacent its other end in operative alignment with the adjacent end of said thermostat element, a plurality of fluid passage openings in said enclosing casing member axially spaced lengthwise thereof and respectively adapted for communication with the inlet and discharge passages of the body and valve means axially movable in said valve enclosing casing member between said fluid passage openings in operative relation to said thermostat element; spring means mounted in said valve enclosing casing member in operative relation to said slidable valve means; and means associated with one of said end walls for removably securing said valve assembly and spring means in the transverse valve assembly chamber of the body.

References Cited

UNITED STATES PATENTS 1,930,227 10/1933 Donahue _____ 236—93
2,534,378 12/1950 Schlaich _____ 236—93

EDWARD J. MICHAEL, *Primary Examiner.*

EVERETT W. KIRBY, *Examiner.*